US012656840B2

(12) United States Patent
Chiu et al.

(10) Patent No.: US 12,656,840 B2
(45) Date of Patent: Jun. 16, 2026

(54) MODULAR LIQUID COOLING ARCHITECTURE FOR LIQUID COOLING

(71) Applicant: Google LLC, Mountain View, CA (US)

(72) Inventors: Jerry Chiu, Pacifica, CA (US); Reza H. Khiabani, San Mateo, CA (US); Xiaojin Wei, Dublin, CA (US); Madhusudan Krishnan Iyengar, Foster City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/953,774

(22) Filed: Nov. 20, 2024

(65) Prior Publication Data

US 2025/0076940 A1     Mar. 6, 2025

Related U.S. Application Data

(62) Division of application No. 17/532,147, filed on Nov. 22, 2021, now Pat. No. 12,174,676.

(51) Int. Cl.
*G06F 1/20* (2006.01)
*F28F 1/00* (2006.01)

(52) U.S. Cl.
CPC ................. *G06F 1/20* (2013.01); *F28F 1/00* (2013.01); *F28F 2210/02* (2013.01); *F28F 2250/108* (2013.01); *G06F 2200/201* (2013.01)

(58) Field of Classification Search
CPC ........ G06F 1/20; G06F 2200/201; F28F 1/00; F28F 2250/108; F28F 9/0202; F28F 9/028
USPC .......................... 361/699; 165/80.4, 156, 174
See application file for complete search history.

(56) References Cited

U.S. PATENT DOCUMENTS

| | | | |
|---|---|---|---|
| 2,288,297 A * | 6/1942 | Naiman ................. | F16L 41/03 137/340 |
| 2,539,669 A | 1/1951 | Newcomer et al. | |
| 4,243,094 A * | 1/1981 | Woodhull, Jr. ........... | F28B 9/08 165/146 |

(Continued)

FOREIGN PATENT DOCUMENTS

| | | |
|---|---|---|
| CN | 112197633 A | 1/2021 |
| EP | 3179191 A1 | 6/2017 |

OTHER PUBLICATIONS

Extended European Search Report for European Patent Application No. 22188993.4 dated Jan. 9, 2023. 6 pages.

(Continued)

*Primary Examiner* — Claire E Rojohn, III
(74) *Attorney, Agent, or Firm* — Lerner David LLP

(57) ABSTRACT

A heat exchanger includes a first manifold having an inlet opening and a second manifold having an outlet opening. A group of conduits fluidly connect the first manifold and the second manifold to one another such that a flow path is established for liquid to flow from the inlet opening to the outlet opening. The flow path includes a select portion that extends through all conduits within the group of conduits. Valves are located in the first manifold and the second manifold. The valves are operable to change the select portion of the flow path from between a first state, wherein the conduits within group of conduits are fluidly connected in parallel with one another, and a second state, wherein the conduits within the group of conduits are fluidly connected in series with one another.

7 Claims, 6 Drawing Sheets

(56) References Cited

U.S. PATENT DOCUMENTS

| | | | | |
|---|---|---|---|---|
| 5,101,640 | A * | 4/1992 | Fukushima | F25B 49/027 |
| | | | | 62/DIG. 17 |
| 7,322,399 | B2 * | 1/2008 | Guerrero | F28F 27/02 |
| | | | | 165/101 |
| 8,094,454 | B2 | 1/2012 | Lowry | |
| 8,235,101 | B2 * | 8/2012 | Taras | F28F 27/02 |
| | | | | 62/238.7 |
| 8,439,104 | B2 * | 5/2013 | de la Cruz | F28D 1/05391 |
| | | | | 165/173 |
| 8,659,897 | B2 * | 2/2014 | Meijer | G06F 1/20 |
| | | | | 361/721 |
| 9,332,674 | B2 | 5/2016 | Campbell et al. | |
| 9,363,924 | B2 * | 6/2016 | Campbell | F24T 10/40 |
| 9,686,889 | B2 | 6/2017 | Campbell et al. | |
| 10,017,028 | B2 * | 7/2018 | Heyl | F28F 27/02 |
| 10,542,640 | B1 | 1/2020 | Leigh et al. | |
| 10,551,127 | B2 * | 2/2020 | Park | F28D 1/0233 |
| 10,602,640 | B1 * | 3/2020 | Tsai | H05K 7/20254 |
| 10,677,531 | B2 * | 6/2020 | Kawabata | F28F 9/26 |
| 10,966,352 | B2 | 3/2021 | Iyengar et al. | |
| 11,105,566 | B2 * | 8/2021 | Todoroki | F25B 41/00 |
| 2008/0023182 | A1 * | 1/2008 | Beamer | F28D 1/05391 |
| | | | | 165/137 |
| 2010/0252242 | A1 * | 10/2010 | Xiangxun | F28D 1/05391 |
| | | | | 165/173 |
| 2012/0011867 | A1 * | 1/2012 | Koons | F28D 1/0443 |
| | | | | 165/165 |
| 2012/0132413 | A1 * | 5/2012 | Cheadle | F28F 27/02 |
| | | | | 165/297 |
| 2012/0281358 | A1 | 11/2012 | Chainer et al. | |
| 2013/0180474 | A1 * | 7/2013 | Wilhelm | F28F 9/22 |
| | | | | 122/451 S |
| 2013/0299132 | A1 * | 11/2013 | Guilford | B23P 15/26 |
| | | | | 29/890.03 |
| 2016/0116224 | A1 | 4/2016 | Shedd et al. | |
| 2016/0223265 | A1 * | 8/2016 | Jindou | F28D 1/0476 |
| 2017/0343300 | A1 * | 11/2017 | Petela | F28D 1/0477 |
| 2018/0100700 | A1 * | 4/2018 | Beaver | F28D 1/0478 |
| 2018/0135900 | A1 * | 5/2018 | Jindou | F28F 9/0202 |
| 2020/0241609 | A1 * | 7/2020 | Selvidge | G06F 1/20 |
| 2020/0249732 | A1 * | 8/2020 | Nakamura | G06F 1/20 |
| 2022/0240421 | A1 * | 7/2022 | Zhang | H05K 7/20772 |
| 2023/0068535 | A1 * | 3/2023 | Chen | G06F 1/20 |
| 2023/0161391 | A1 * | 5/2023 | Chiu | F28D 1/05316 |
| | | | | 361/699 |
| 2024/0023287 | A1 * | 1/2024 | Chehade | G06F 1/20 |

OTHER PUBLICATIONS

Office Action for European Patent Application No. 22188993.4 dated Jul. 30, 2024. 3 pages.
Office Action for European Patent Application No. 22188993.4 dated Oct. 20, 2025. 6 pages.

* cited by examiner

MODULAR LIQUID COOLING ARCHITECTURE FOR LIQUID COOLING

CROSS-REFERENCE TO RELATED APPLICATIONS

The present application is a divisional of U.S. patent application Ser. No. 17/532,147, filed on Nov. 22, 2021, the disclosure of which is incorporated herein by reference.

BACKGROUND

Computer hardware, such as dual in-line memory modules ("DIMMs") and central processing units ("CPUs"), generates heat during operation, and tends to operate better and fail at lower rates when cooled. For this reason, liquid cooling systems have been developed to cool computer hardware. Some motherboards, server assemblies, and other apparatus in which heat-generating computer hardware can operate are modular in design. That is, some devices may be configured to allow the addition and removal of a variable quantity of DIMMs, CPUs, or other heat generating hardware. Moreover, hardware of a given type, such as individual DIMMs, may have variable cooling needs depending on the model and use case. Cooling systems for these devices are therefore typically designed for the maximum-use case of a specific apparatus in which computer hardware may be installed so that, when a maximum amount of computer hardware is installed and running, all of the hardware will be cooled adequately. As a result, when less than the maximum amount of hardware is installed and in operation, more coolant than necessary may flow through the cooling system. Cooling efficiency may be improved by systems that could be dynamically adapted to various arrangements of computer hardware.

BRIEF SUMMARY

Aspects of this disclosure are directed to a liquid cooling system that can independently adjust or shut off flow at certain points in the system. In this regard, the cooling system may include multiple conduits or cold plates connected in parallel flow between a first manifold and a second manifold. The first manifold may be, for example, an inlet manifold and the second manifold may be an outlet manifold. Either or both of the inlet manifold and the outlet manifold may include one or more valves located between points where different conduits connect to the manifold. The one or more valves may be operable to adjust or shut off liquid flow across certain points in the manifold. The one or more valves may therefore be operable to change a flow pattern or sequence through the cooling system. For example, the valves may be operable to change the fluid connection among the conduits between parallel and series flow. The valves may be able to place some conduits in series flow and other conduits in parallel flow. The valves may further be operable to change an order of the series connection between the conduits and, as a result, the relative temperature of the cooling fluid as it passes certain components. The cooling system overall may therefore be operable to prioritize cooling of components that require more cooling by directing the cooling liquid to flow past those components before it flows past components that need less cooling. Likewise, the cooling system may be operable to direct the liquid such that components with lower cooling needs, or empty sockets in which no component is installed, are passed by the liquid last. The cooling system may therefore be configurable to adjust an amount of cooling fluid used to suit a given arrangement of computer hardware.

In some arrangements, cooling systems may include an inlet and an outlet manifold positioned on opposite ends of one or more groups of parallel DIMM slots. Liquid conduits may extend in cold plates positioned adjacent the DIMM slots to fluidly connect the manifolds. Each DIMM slot may be positioned between two cold plates such that a DIMM in any slot will be in contact with two cold plates. Both the inlet manifold and the outlet manifold may have valves between some of the respective points of connection with the conduits in a single group of conduits. When all of the valves in the inlet manifold and the outlet manifold positioned between the conduits that flow across a single group of DIMM slots are open, the cooling liquid may flow in parallel from the inlet manifold, through the cold plates associated with the group of conduits, and into the outlet manifold. The valves in the inlet manifold may be staggered relative to the valves in the outlet manifold such that, when all of the valves in both manifolds positioned between the conduits that flow across a single group of DIMM slots are closed, the cooling liquid will flow through the conduits in series in a serpentine pattern that travels from the inlet manifold to the outlet manifold and back again at least once. For example, in a group of five conduits spaced to run alongside four DIMMs, with the first through fifth conduits in the group being connected to each manifold in numerical order, one of the manifolds may include a valve between points of connection for the first and second conduit and another valve between points of connection for the third and fourth conduit while the other manifold includes a valve between points of connection for the second and third conduit and another valve between points of connection for the fourth and fifth conduit.

In another aspect, a heat exchanger may comprise a first manifold having an inlet opening, a second manifold having an outlet opening, and a group of conduits fluidly connecting the first manifold and the second manifold to one another such that a flow path is established for liquid to flow from the inlet opening to the outlet opening. The flow path may include a select portion that extends through all conduits within the group of conduits. The heat exchanger may also comprise valves located in the first manifold and the second manifold. The valves may be operable to change the select portion of the flow path between a first state, wherein the conduits within group of conduits are fluidly connected in parallel with one another, and a second state, wherein the conduits within the group of conduits are fluidly connected in series with one another.

In some arrangements according to any of the foregoing, the group of conduits may be a first group of conduits and the select portion may be a first select portion. The heat exchanger may also comprise a second group of conduits fluidly connecting the first manifold and the second manifold to one another such that a second select portion of the flow path between the inlet opening. The outlet opening may extend through all conduits within the second group of conduits. The valves may be operable to change the first select portion of the flow path between the first state and the second state without changing the second select portion of the flow path.

In some arrangements according to any of the foregoing, the valves may be operable to change the second select portion of the flow path between a first state, wherein the conduits within the second group of conduits are connected in parallel with one another, and a second state, wherein the conduits within the second group of conduits are connected in series with one another, without changing the first select portion of the flow path.

In some arrangements according to any of the foregoing, the heat exchanger may comprise an independent conduit fluidly connecting the first manifold and the second manifold in parallel with the first group of conduits and the second group of conduits.

In some arrangements according to any of the foregoing, the first select portion and second select portion may be in parallel with one another when the first select portion is in the first state. The second select portion may follow the first select portion in series when the first select portion is in the second state.

In some arrangements according to any of the foregoing, every conduit within the first group of conduits may be fluidly connected to a portion of the first manifold nearer to the inlet opening than a portion of the first inlet manifold to which every conduit in the second group of conduits is connected.

In some arrangements according to any of the foregoing, the first select portion and the second select portion may be in parallel with one another when the first select portion is in the first state and when the first select portion is in the second state.

In some arrangements according to any of the foregoing, every conduit within the first group of conduits may be fluidly connected to a portion of the first manifold on an opposite side of the inlet opening from a portion of the first inlet manifold to which every conduit in the second group of conduits is connected.

In some arrangements according to any of the foregoing, the inlet opening may be a first inlet opening. The heat exchanger may also comprise a third manifold having a second inlet opening. The heat exchanger may also comprise a third group of conduits fluidly connecting the third manifold to the second manifold.

In some arrangements according to any of the foregoing, the outlet opening may be a first outlet opening. The heat exchanger may also comprise a third manifold having a second outlet opening. The heat exchanger may also comprise a third group of conduits fluidly connecting the first manifold to the third manifold.

In some arrangements according to any of the foregoing, the group of conduits may comprise a first conduit fluidly connected to the first manifold at a first point and fluidly connected to the second inlet manifold at a second point, a second conduit fluidly connected to the first manifold at a third point and fluidly connected to the second inlet manifold at a fourth point, and a third conduit fluidly connected to the first manifold at a fifth point and fluidly connected to the second inlet manifold at a sixth point, the third point being between the first and fifth points and the fourth point being between the second and sixth point. The valves comprise a first valve operable to open and close fluid connection between the first and third points, and a second valve operable to open and close fluid connection between the fourth and sixth points. In some arrangements according to any of the foregoing, the group of conduits may further comprise a fourth conduit fluidly connected to the first manifold at a seventh point and fluidly connected to the second manifold at an eighth point. The seventh point may be on an opposite side of the fifth point from the third point and the eighth point may be on an opposite side of the sixth point from the fourth point. The valves may further comprise a third valve operable to open and close fluid connection between the fifth and seventh points. In some arrangements according to any of the foregoing, the group of conduits may further comprise a fifth conduit fluidly connected to the first manifold at a ninth point and fluidly connected to the second manifold at a tenth point. The ninth point may be on an opposite side of the seventh point from the fifth point and the tenth point may be on an opposite side of the eight point from the sixth point. The valves may further comprise a fourth valve operable to open and close fluid connection between the eighth and tenth points.

In some arrangements according to any of the foregoing, the valves may be operable to change the select portion of the flow path to a third state wherein at least one conduit within the group of conduits is fluidly connected in parallel with at least one other conduit within the group of conduits and at least one conduit within the group of conduits is fluidly connected in series with at least one other conduit within the group of conduits.

In another aspect, a liquid cooling system for a computer hardware arrangement may comprise a first manifold having an inlet opening, a second manifold having an outlet opening, and a group of cold plates extending between the first and second manifolds. Each of the cold plates within the group of cold plates may have a conduit extending therethrough and fluidly connecting the first manifold to the second manifold to define a portion of a flow path between the inlet and outlet openings. The system may be convertible between a first state wherein the conduits in the cold plates are fluidly connected in parallel and a second state wherein the conduits in the cold plates are fluidly connected in series.

In some arrangements according to any of the foregoing, the cold plates within the group of cold plates may be evenly spaced from one another.

In some arrangements according to any of the foregoing, the group of cold plates may be a first group of cold plates and comprising a second group of cold plates. The cold plates within the second group of cold plates may be evenly spaced from one another. Each of the cold plates within the second group of cold plates may have a conduit extending therethrough and fluidly connecting the first manifold to the second manifold to define a portion of the flow path. The system may be convertible between a third state wherein the conduits in the cold plates are fluidly connected in parallel and a fourth state wherein the conduits in the cold plates are fluidly connected in series. Each of the first state and the second state may be independent from and capable of coexisting with both the third state and the fourth state.

In some arrangements according to any of the foregoing, the system may comprise an independent cold plate having a conduit extending therethrough and fluidly connecting the first manifold and the second manifold to define a portion of the flow path. The independent cold plate may be equally spaced from the first group and the second group by a distance greater than a distance between adjacent cold plates in the first group and a distance between adjacent cold plates in the second group.

In some arrangements according to any of the foregoing, the system may comprise either or both of an independent cold plate fluidly connected upstream of the inlet opening relative to the flow path and an independent cold plate fluidly connected downstream of the outlet opening relative to the flow path.

In another aspect, a method of adjusting a cooling capacity of a computer hardware cooling system may include actuating valves in the system to change a fluid connection among cold plates extending between DIMM slots between parallel and series flow.

In some, though not all, implementations of the foregoing method, the fluid connection among the cold plates may be provided by conduits extending along the cold plates and between two manifolds, and the valves may be located within the manifolds. Each of the valves may be located at a point within its respective manifold between two fluid connection points, wherein each of the fluid connection points is a location where the manifold is fluidly connected to a respective one of the conduits.

DETAILED DESCRIPTION

Figure 1:
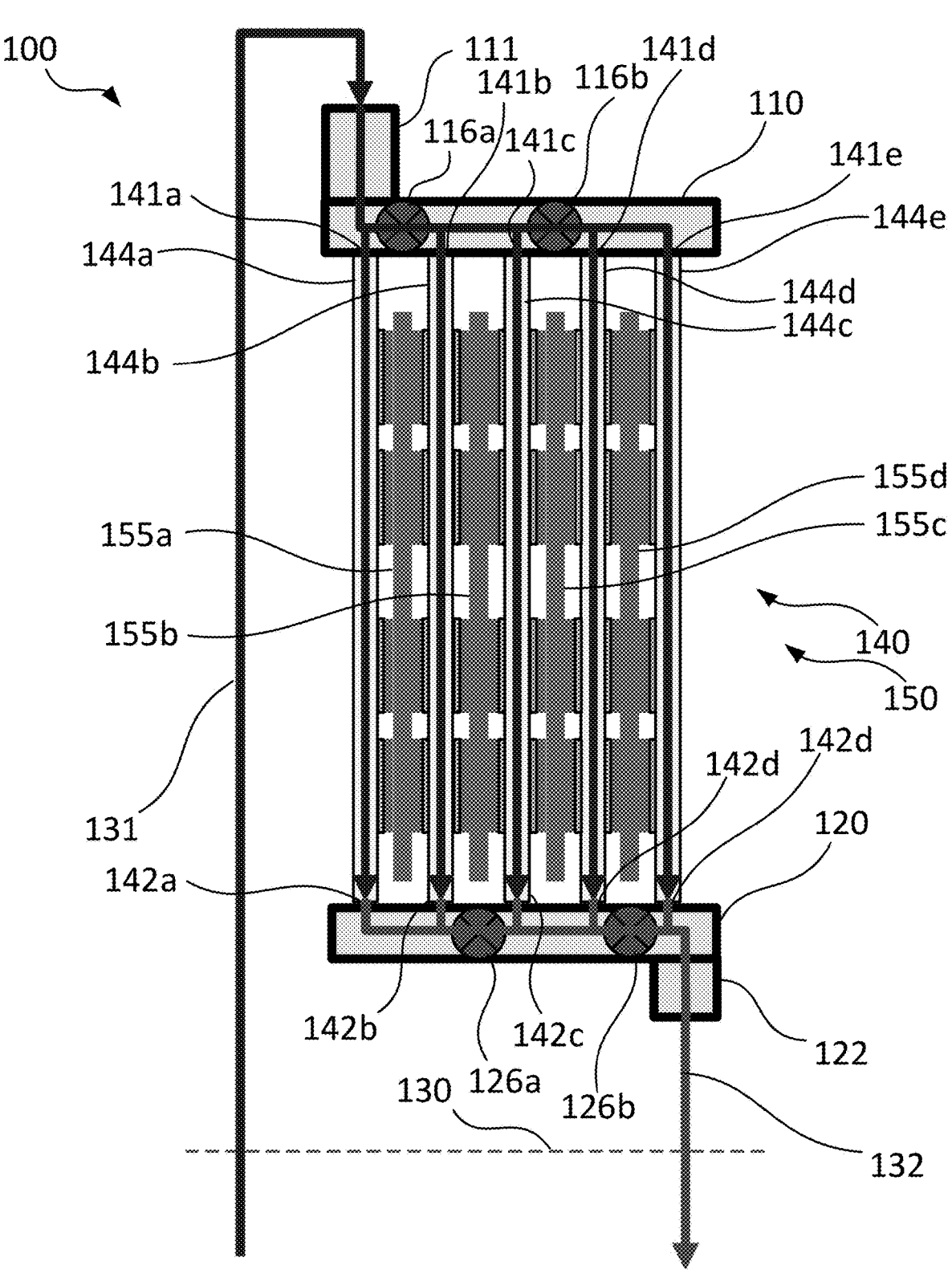
FIG. 1 is a schematic illustration of a computer hardware cooling system in a first state.

FIG. 1 illustrates a cooling system 100 for cooling a computer hardware arrangement 150. Cooling system 100 is a heat exchanger that includes a cold or inlet manifold 110, a hot or outlet manifold 120, and cold plates 144*a*, 144*b*, 144*c*, 144*d*, 144*e*. First cold plate 144*a*, second cold plate 144*b*, third cold plate 144*c*, fourth cold plate 144*d*, and fifth cold plate 144*e* are arranged in order from first through fifth and left to right from the perspective of FIG. 1 and may be referred to collectively as cold plates 144 that together constitute a cold plate group 140. The illustrated example of system 100 includes five cold plates 144, but various arrangements of system 100 can include any plural number of cold plates 144.

Each cold plate 144 has a respective point of connection to both inlet manifold 110 and outlet manifold 120. Thus, first cold plate 144*a* connects to inlet manifold 110 at a first inlet manifold connection point 141*a* and connects to outlet manifold 120 at a first outlet manifold connection point 142*a*, second cold plate 144*b* connects to inlet manifold 110 at a first inlet manifold connection point 141*b* and connects to outlet manifold 120 at a second outlet manifold connection point 142*b*, third cold plate 144*c* connects to inlet manifold 110 at a third inlet manifold connection point 141*c* and connects to outlet manifold 120 at a third outlet manifold connection point 142*c*, fourth cold plate 141*d* connects to inlet manifold 110 at a fourth inlet manifold connection point 141*d* and connects to outlet manifold 120 at a fourth outlet manifold connection point 142*d*, and fifth cold plate 144*e* connects to inlet manifold 110 at a fifth inlet manifold connection point 141*e* and connects to outlet manifold 120 at a fifth outlet manifold connection point 142*e*.

Each cold plate 144 includes a contact element, such as a plate of thermally conductive material, and a conduit extending through the contact element and fluidly connecting inlet manifold 110 to outlet manifold 120. Cooling of any object with any cold plate 144 may be therefore achieved by placing the contact element of any cold plate 144 in contact with a with the object and running liquid below the target temperature for the object through the cold plate's 144 conduit. The contact element will conduct heat from the object to the fluid in the conduit, and the heated fluid will be carried away by the continuing flow of fluid. Suitable thermally conductive materials include, for example, certain ceramics, polymers, metals, etc., with some specific examples of suitable metals being copper or aluminum. Cold plate 144 may optionally be constructed of one of the foregoing materials or any combination of the foregoing materials. For example, the contact element may be monolithically formed, and the conduit may simply be a space provided within the contact element. In another example, a tube, which may be round, fattened, or in any other shape of a first material may define the conduit, and a spreader of a second material and surrounding the tube may define an outer surface of the contact element. In some examples, the tube may be a flattened copper tube, and the spreader may be constructed of aluminum.

Inlet manifold 110 includes an inlet opening 111 that receives relatively cool supply fluid 131 from a fluid source 130. Similarly, outlet manifold 120 includes an outlet opening 122 from which return fluid 132 carrying heat received from the cooled hardware returns to the fluid source 130. Inlet opening 111 is on an opposite side of first inlet manifold connection point 141*a* from second inlet manifold connection point 141*b*, third inlet manifold connection point 141*c*, fourth inlet manifold connection point 141*d*, and fifth inlet manifold connection point 141*e*. Outlet opening 122 is on an opposite side of fifth outlet manifold connection point 142*e* from fourth outlet manifold connection point 142*d*, third outlet manifold connection point 142*c*, second outlet manifold connection point 142*b*, and first outlet manifold connection point 142*a*. A flow path from inlet opening 111 to outlet opening 122 carries the fluid through inlet manifold 110, cold plates 144, and outlet manifold 120 as indicated by the lines extending through inlet manifold 110, cold plates 144, and outlet manifold 120 and in the direction shown by the arrows drawn on cold plates 144. Fluid source 130 may be any system that can provide fluid at a suitable temperature and cool or dispose of fluid returned at an unsuitable temperature. For example, fluid source 130 may be a coolant supply system of a building in which cooling system 100 is installed, such as the coolant supply systems commonly found in commercial data centers. The cooling fluid can be liquid, such as, for example, water, glycol and water solutions, or dielectric fluids such as fluorocarbons, or certain other liquids, or gas such as, for example, air, carbon dioxide, or certain other gases.

In the illustrated example, cold plates 144 extend along dual in-line memory modules ("DIMMs") 155*a*, 155*b*, 155*c*, 155*d*. First DIMM 155*a*, second DIMM 155*b*, third DIMM 155*c*, and fourth DIMM 155*d* are arranged in order from first through fourth and from left to right from the perspective of FIG. 1 and may be referred to collectively as DIMMs 155 that together constitute a DIMM group 150. Each DIMM 155 is located between and in contact with two adjacent cold plates 144. DIMMs 155 may contact cold plates 144 directly or through a thermal interface material pad. In DIMMs 155 of typical construction, and in the illustrated example, each DIMM 155 includes a printed circuit board ("PCB") running along a length thereof and multiple dynamic random-access memory ("DRAM") chips on either side of the PCB. In the illustrated example, the DRAM chips contact cold plates 144 while the PCB is spaced from cold plates 144. Each pair of adjacent cold plates 144 within cold plate group 140 may be equally spaced from each other such that equally sized DIMMs 155 may each be contacted by a cold plate 144 on both sides.

Thus, in the illustrated example, system 100 is installed to extend over four parallel DIMM slots, with each DIMM slot being located between a pair of adjacent cold plates 144. However, DIMMs 144 are shown and described by way of example only, and system 100 and any other systems in this disclosure may be adapted for cooling other hardware. Thus, for any reference to an interaction between any particular cooling system and DIMMs throughout this description, it should be understood that the cooling system could interact with other hardware in a similar manner. Moreover, though four DIMMs 144 are shown in the illustrated example, system 100 may be adapted for any number of DIMMs or hardware elements to be cooled.

Inlet manifold 110 contains a first inlet manifold valve 116a and a second inlet manifold valve 116b numbered according to increasing distance along the flow path from inlet opening 111 and which may collectively be referred to as inlet manifold valves 116. First inlet manifold valve 116a is located between first inlet manifold connection point 141a and second inlet manifold connection point 141b. Thus, when first inlet manifold valve 116a is closed, fluid is prevented from flowing between first inlet manifold connection point 141a and second inlet manifold connection point 141b within inlet manifold 110, and when first inlet manifold valve 116a is open, fluid may flow between first inlet manifold connection point 141a and second inlet manifold connection point 141b within inlet manifold 110. First inlet manifold valve 116a is therefore operable to open and close fluid connection between first inlet manifold connection point 141a and second inlet manifold connection point 141b within inlet manifold 110. Second inlet manifold valve 116b is similarly located within inlet manifold 110 between third inlet manifold connection point 141c and fourth inlet manifold connection point 141d. Second inlet manifold valve 116b is therefore similarly operable to open and close fluid connection between third inlet manifold connection point 141c and fourth inlet manifold connection point 141d.

Outlet manifold 120 similarly contains a first outlet manifold valve 126a and a second outlet manifold valve 126b numbered according to increasing distance along the flow path from inlet opening 111 and which may collectively be referred to as outlet manifold valves 126. First outlet manifold valve 126a is located within outlet manifold 120 between second outlet manifold connection point 142b and third outlet manifold connection point 142c, and second outlet manifold valve 126b is located within outlet manifold 120 between fourth outlet manifold connection point 142d and fifth outlet manifold connection point 142e. First outlet manifold valve 126a is therefore operable to open and close fluid connection between second outlet manifold connection point 142b and third outlet manifold connection point 142c within outlet manifold 120, and second outlet manifold valve 126b is operable to open and close fluid connection between fourth outlet manifold connection point 142d and fifth outlet manifold connection point 142e within outlet manifold 120.

Valves 116, 126 may be any type of valve operable to selectively either permit fluid flow across a point or seal off and prevent fluid flow across the same point. Valves 116, 126 may therefore be manually or mechanically operated valves in some examples, and in other examples valves 116, 126 may be electrically operated and controlled valves. Valves 116, 126 in some arrangements may therefore be electronically controllable by a control circuit, programmable controller, or computer, etc. The mechanism of the valves may be in the style of, for example, ball valves, butterfly valves, check valves, gate valves, globe valves, needle valves, pinch valves, plug valves, or any other type of valve that can selectively permit or prevent flow across a point in a fluid flow path.

The above described positions of the valves 116, 126 means that inlet manifold valves 116 and outlet manifold valves 126 are staggered relative to each other. That is, inlet manifold valves 116 are offset within inlet manifold 110 relative to outlet manifold valves' 126 positions within outlet manifold 120 such that the cold plates 144 that inlet manifold valves 116 stand between within inlet manifold 110 alternate with the cold plates 144 between which outlet manifold valves 126 stand within outlet manifold 120. Inlet manifold valves 116 are therefore offset from outlet manifold valves 126 in at least two dimensions, one dimension being a location along the flow path within the respective manifolds 110, 120, the other dimension being along the manifolds 144. Both first outlet manifold valve 126a and second outlet manifold valve 126b are operable to open or close fluid connection within outlet manifold 120 between a respective pair of cold plates 144 that neither inlet manifold valve 116 can close the connection between within inlet manifold 110. Similarly, both first inlet manifold valve 116a and second inlet manifold valve 116b are operable to open or close fluid connection within inlet manifold 110 between a respective pair of cold plates 144 that neither outlet manifold valve 126 can close the connection between within outlet manifold 120. The staggered pattern of valves and connection points may be continued to accommodate any number or size of cold plates, wherein valves 116 within the manifold into which fluid is supplied, such as inlet manifold 110, are located immediately following each odd numbered supply side connection point 141 and immediately preceding each even numbered supply side connection point 141, and valves 126 in the opposite manifold, such as outlet manifold 110, are located immediately following each even numbered non-supply side connection point 142 and immediately preceding each odd numbered non-supply side connection point 142, except that no valve needs to precede the connection points for the first cold plate or follow the connection points for the last cold plate.

FIG. 1 illustrates the flow path of the cooling fluid when system 100 is in a first or parallel state in which all inlet manifold valves 116 and all outlet manifold valves 126 are open. As shown by the arrows on the flow lines within manifolds 144 in FIG. 1, the flow path of the cooling fluid extends through each cold plate 144 in parallel from inlet manifold 110 to outlet manifold 120. Thus, each cold plate 144 receives the cooling fluid from inlet manifold 110 at an approximately equal temperature when system 100 is in the parallel state. First cold plate 144a and fifth cold plate 144e each contact only one DIMM 155, meaning system has somewhat greater cooling capacity for first DIMM 155a and fourth DIMM 155d than for second DIMM 155b and third DIMM 155c, but system 100 otherwise has approximately equal cooling capacity for each DIMM 155 in DIMM group 150 in the parallel state.

Figure 2:
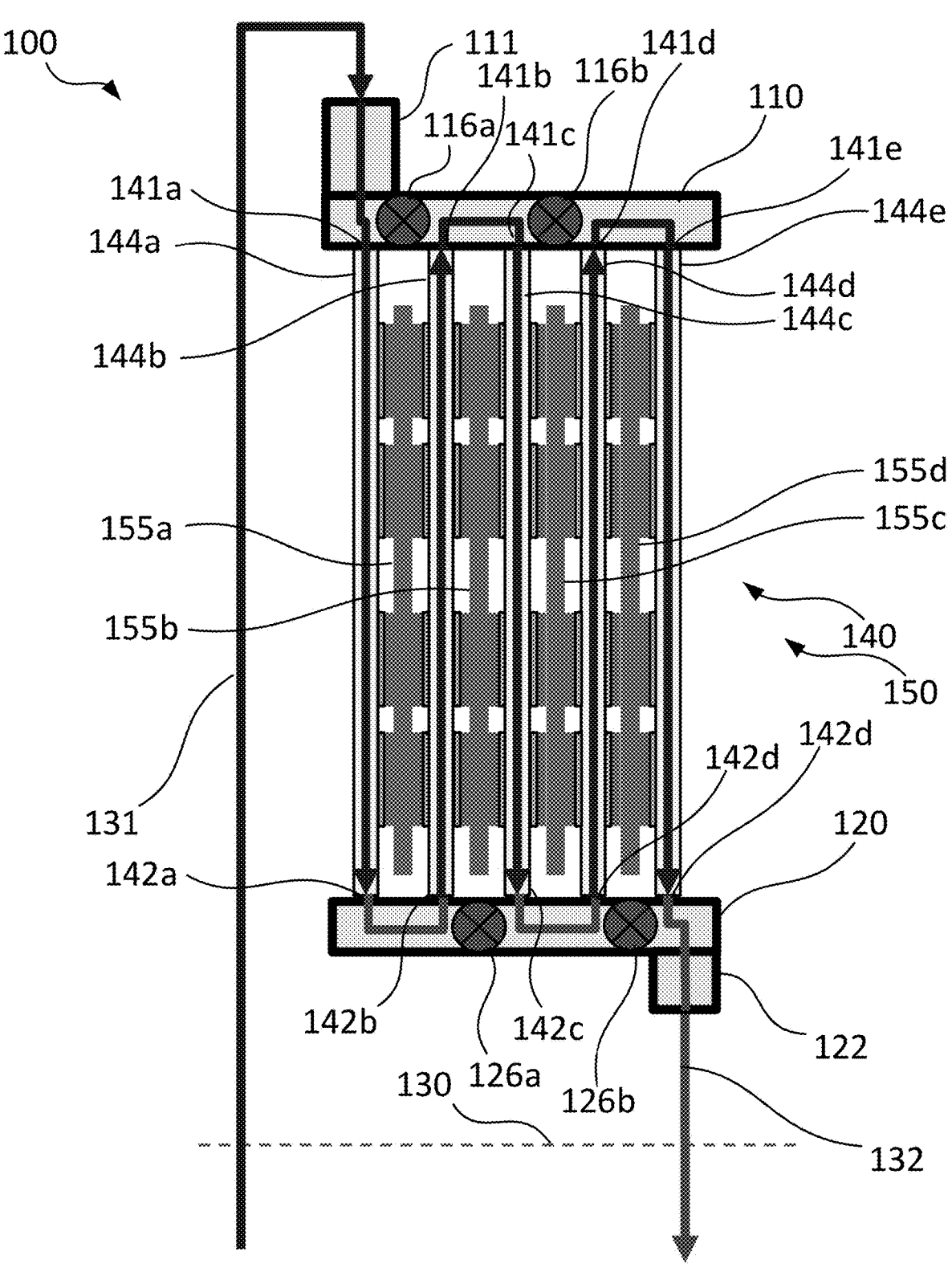
FIG. 2 is a schematic illustration of the computer hardware cooling system of FIG. 1 in a second state.

FIG. 2 illustrates the flow path of the cooling fluid when system 100 is in a second or series state in which all inlet manifold valves 116 and all outlet manifold valves 126 are closed. Because inlet manifold valves 116 are staggered from outlet manifold valves 126, connection between any pair of adjacent cold plates 144 is closed only within one of the manifolds 110, 120, while connection between the same pair of adjacent cold plates 144 remains open in the opposite manifold 110, 120, and the manifold 110, 120 within which the connection remains open alternates among adjacent pairs. Thus, no cold plate 144 is shut off entirely in the series state of system 100.

Because inlet opening 111 is on an opposite side of first inlet manifold connection point 141a from cold plate group 140 as a whole while outlet opening 122 is on an opposite side of fifth outlet manifold connection point 142e from cold plate group 140 as a whole, the cooling fluid must travel in a serpentine pattern from inlet manifold 110 to outlet manifold 120 and back again, through each cold plate 144 in cold plate group 140, to reach outlet opening 122 when system 100 is in the series state. As shown by the arrows on the flow lines within manifolds 144 in FIG. 2, the flow path of the cooling fluid therefore extends through each cold plate 144 in series from inlet opening 111 to outlet opening 122. Thus, assuming all DIMMs 155 exceed the temperature of return fluid 132, each cold plate 144 other than first cold plate 144a receives the cooling fluid at a greater temperature than the temperature at which the cooling fluid was received by the preceding cold plate 144 when system 100 is in the series state.

The series state of system 100 as shown in FIG. 2 prioritizes cooling to hardware nearer along the flow path to inlet opening 111. First cold plate 144a receives the cooling fluid at the lowest temperature, second cold plate 144b receives the cooling fluid at a slightly higher temperature, and so on to fifth cold plate 144e, when cold plates 144 are connected in series. System 100 therefore has the greatest cooling capacity at the location of first DIMM 155a and the least cooling capacity at the location of fourth DIMM 155d in the series state. For this reason, the series state may be more efficient than the parallel state for applications where hardware further along the flow path from inlet opening 111 needs less cooling than other hardware, or when one or more downstream DIMMs 155 are deactivated or removed. As such, the operability of valves 116, 126 to change system 100 between the parallel state and the series state enables system 100 to be dynamically adapted to various arrangements of hardware having different cooling needs.

Though not specifically illustrated, flow paths that are partially in parallel and partially in series can be achieved by operating like numbered pairs of one inlet manifold valve 116 and one outlet manifold valve 126 independently from one another. For example, if first inlet manifold valve 116a and first outlet manifold valve 126a are left open while second inlet manifold valve 116b and second outlet manifold valve 126b are closed, the cooling fluid will flow in parallel through first cold plate 144a, second cold plate 144b, and third cold plate 144c, then in series through fourth cold plate 144d followed by fifth cold plate 144e. Similarly, if first inlet manifold valve 116a and first outlet manifold valve 126a are closed while second inlet manifold valve 116b and second outlet manifold valve 126b are left open, the cooling fluid will flow in series through first cold plate 144a followed by second cold plate 144b before flowing in parallel through third cold plate 144c, fourth cold plate 144d, and fifth cold plate 144e.

Figure 3:
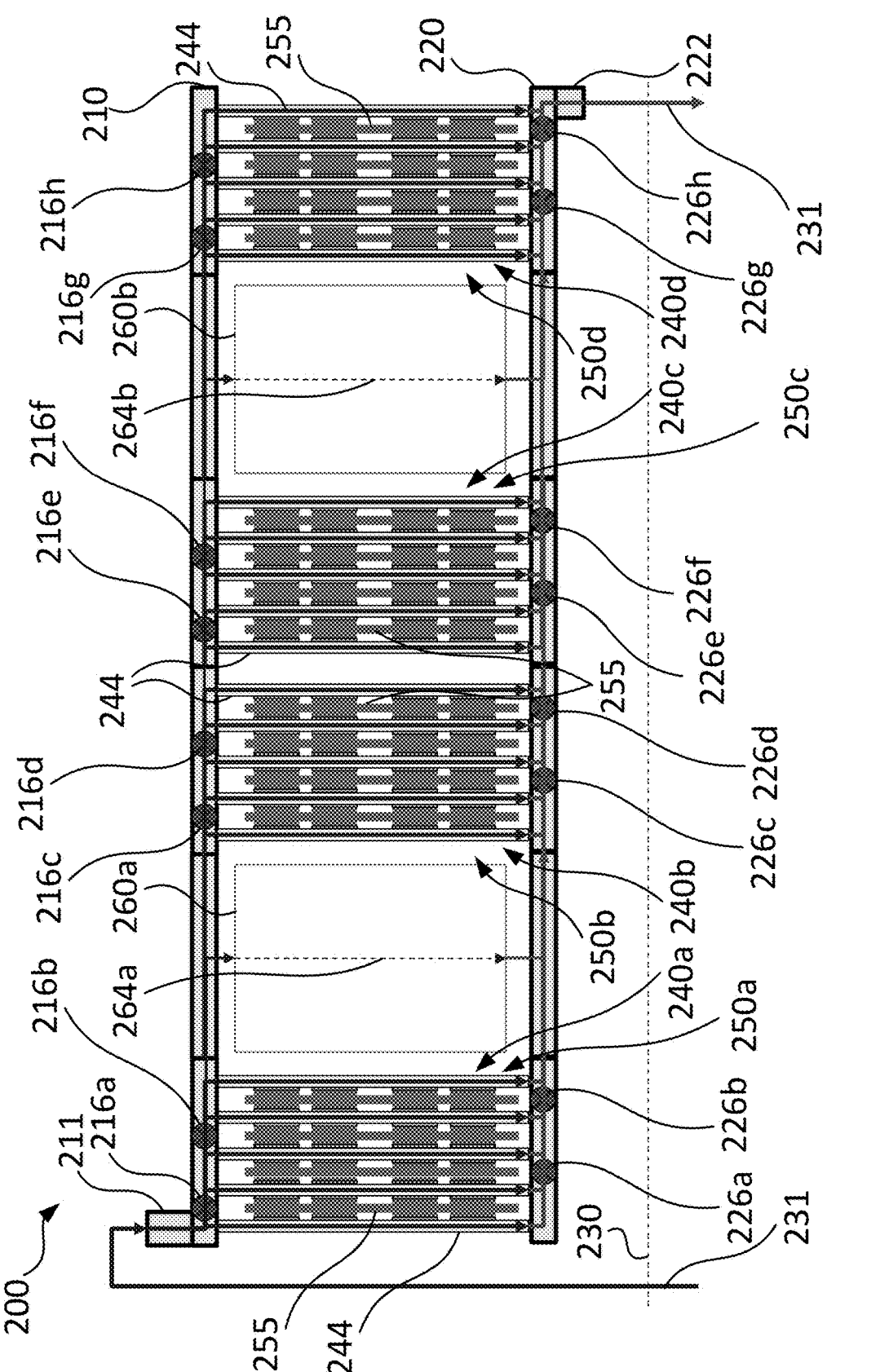
FIG. 3 is a schematic illustration of a computer hardware cooling system in a multiple load type arrangement.

FIG. 3 shows a system 200 including an inlet manifold 210 and an outlet manifold 220 having multiple distinct cold plate groups 240 and independent cold plates 264 connected, when all valves 216, 226 are open, in parallel between inlet manifold 210 and outlet manifold 220. System 200 also includes a first cold plate group 240a, a second cold plate group 240b, a third cold plate group 240c, and a fourth cold plate group 240d, which are numbered according to increasing distance along inlet manifold 210 from an inlet opening 211 of inlet manifold 210 and may be referred to collectively as cold plate groups 240. In system 200, elements are generally alike to like numbered elements of system 100 except for specifically stated or illustrated differences. As such, inlet manifold 210 receives supply fluid 231 from a fluid system 230 through inlet opening 211 and outlet manifold 220 releases return fluid 232 through an outlet opening 222 in a manner similar to the receipt of supply fluid 131 by inlet manifold 110 through inlet opening 111 and release of return fluid 132 from outlet manifold 120 through outlet opening 122. Likewise, each cold plate group 240 includes multiple cold plates 244, and each cold plate 244 includes a thermally conductive contact element and a conduit that extends through the contact element and provides fluid connection between inlet manifold 210 and outlet manifold 220. The four cold plate groups 240 shown in FIG. 3 are presented as an example, and systems 200 according to other arrangements and having any plural number of cold plate groups 240 connected to inlet manifold 210 on a common side of inlet opening 211 and connected in an opposite order to outlet manifold 220 on a common side of outlet opening 222 may operate in a similar manner.

Inlet manifold 210 contains a first inlet manifold valve 216a, a second inlet manifold valve 216b, a third inlet manifold valve 216c, a fourth inlet manifold valve 216d, a fifth inlet manifold valve 216e, a sixth inlet manifold valve 216f, a seventh inlet manifold valve 216g, and an eighth inlet manifold valve 216h numbered according to increasing distance along the flow path from inlet opening 211 and which may collectively be referred to as inlet manifold valves 216. Outlet manifold 220 similarly contains a first outlet manifold valve 226a, a second outlet manifold valve 226b, a third outlet manifold valve 226c, a fourth outlet manifold valve 226d, a fifth outlet manifold valve 226e, a sixth outlet manifold valve 226f, a seventh outlet manifold valve 226g, and an eighth outlet manifold valve 226h numbered according to increasing distance along the flow path from inlet opening 211 and which may collectively be referred to as outlet manifold valves 226. Two inlet manifold valves 216 and two outlet manifold valves 226 are associated with each manifold group 240 in numerical sequence such that first inlet manifold valve 216a, first outlet manifold valve 226a, second inlet manifold valve 216b, and second outlet manifold valve 226b are associated with first cold plate group 240a, while third inlet manifold valve 216c, third outlet manifold valve 226c, fourth inlet manifold valve 216d, and fourth outlet manifold valve 226d are associated with second cold plate group 240b and so on.

The inlet manifold valves 216 associated with any cold plate group 240 are staggered relative to the outlet manifold valves 226 associated with the same cold plate group 240 in the same manner as described above with regard to valves 116, 126 and cold plate group 140 of FIGS. 1 and 2. As such, valves 216, 226 are operable to change the portion of system's 200 flow path through each cold plate group 240 between parallel flow and series flow. Valves 216, 226 associated with any cold plate group 240 may optionally be operable independently from valves 216, 226 associated with other cold plate groups 240 such that parallel or series flow may be chosen individually for each cold plate group 240. As noted above with regard to cold plate group 140, the illustrated arrangement of four cold plates 244, two inlet manifold valves 216, and two outlet manifold valves 226 is merely an example, and cold plate groups 240 according to other arrangements may have other numbers of cold plates 244 and valves 216, 226. A group of cold plates having any odd number of at least three cold plates and having a number of staggered, paired, associated valves equal to one less than the number of cold plates may function in the same way as described with regard to cold plate groups 140, 240.

Because cold plate groups 240 are connected to manifolds 210, 220 sequentially, inlet opening 211 is on an opposite side of the connections of first cold plate group 240a to inlet manifold 210 from the connection points of all other cold plate groups 240, and outlet opening 222 is on an opposite side of the connection point of fourth cold plate group 240d, which is the last cold plate group 240, from the connection points of all other cold plate groups 240 to outlet manifold 220, the flow path from inlet opening 211 to outlet opening 222 must pass through each cold plate group 240. When all valves 216, 226 are open, the flow path from inlet opening 211 to outlet opening 222 will flow through the cold plate groups 240 in parallel such that each cold plate group 240 will receive fluid at an equal or nearly equal temperature. However, operating valves 216, 226 to create a series connection between two cold plates 244 within any cold plate group 240 will cause cooling fluid to reach any higher numbered cold plate groups 240 only after passing through the series-connected cold plates 244. For example, if third inlet manifold valve 216c, third outlet manifold valve 226c, fourth inlet manifold valve 216d, and fourth outlet manifold valve 216d are closed to put second cold plate group 240 in the series flow state, cooling fluid will only reach third cold plate group 240c and fourth cold plate group 240d after having passed both first cold plate group 240a and second cold plate group 240b. Thus, placing any cold plate group 240 into the series state will create a series flow relationship between that cold plate group 240 and some of the other cold plate groups 240.

Each cold plate group 240 is arranged to cool DIMMs 255 within a respective and like numbered one of first DIMM group 250a, second DIMM group 250b, third DIMM group 250c, and fourth DIMM group 250d, which can be referred to collectively as DIMM groups 250. Like cold plate groups 240, DIMM groups 250 may differ in number in arrangements other than the illustrated example. The connection of multiple cold plate groups 240 along a common flow path, and the above described capability to operate valves 216, 226 to create series or parallel connection among different cold plate groups 240 as well as among different cold plates 244 within any cold plate group 240 enables system 200 to be dynamically reconfigured among several different flow paths. System 200 can therefore be adapted to efficiently cool a wide variety of differing combination and quantities of DIMMs 255. For example, if any cold plate group 240 is placed into the series state, DIMMs 255 having greater cooling needs may be placed in a lower-numbered DIMM group 250 to be cooled by fluid that has not passed through any higher numbered cold plate groups 240. Likewise, if a total number of DIMMs 255 to be cooled is less than the maximum number of DIMMs 255 that can fit between cold plates 244 in system 200, DIMM slots located among cold plates 244 of higher numbered cold plate groups 240 may be left empty such that the cooling fluid will pass the empty DIMM slots only after having cooled at least one installed and operating DIMM 255.

In addition to cold plate groups 240, system 200 may optionally be also include one or more independent cold plates 264, such as first independent cold plate 264a and second independent cold plate 264b as shown in the illustrated example. Independent cold plates 264 are not among any cold plate group 240 and are therefore not necessarily associate with any particular valve 216, 226. However, the flow path across independent cold plates 264 may also be affected by the operation of valves 216, 226 nonetheless. For example, because independent cold plates 264 are connected to inlet manifold 210 on the same side of inlet opening 211 as cold plate groups 240 and independent cold plates 264 are connected to outlet manifold 220 on the same side of outlet opening as cold plate groups 240, if all valves 216, 226 are open as shown in FIG. 3, the flow path from inlet opening 211 to outlet opening 222 will extend through independent cold plates 264 in parallel with the cold plate groups 240. If third cold plate group 240c is converted to the series state while all other cold plate groups 240 remain in the parallel state, cooling fluid will flow through first independent cold plate 264a in parallel with first cold plate group 240a and second cold plate group 240b before flowing through third cold plate group 240c, and the cooling fluid will flow through second independent cold plate 264b in parallel with fourth cold plate group 240d after flowing through third cold plate group 240c.

Independent cold plates 264 may optionally be spaced shorter or farther from cold plate groups 240 than adjacent cold plates 244 within cold plate groups 240 are spaced from each other. Independent cold plates 264 may optionally be spaced equally between two cold plate groups 240 as shown in the illustrated example. The possibility to space independent cold plates 264 away from cold plate groups 240 by a different distance than adjacent cold plates 244 are spaced from each other suits independent cold plates 264 for cooling hardware having a different shape and size than the DIMMs 255 cooled by cold plate groups 240 as shown in the illustrated example, though in other examples independent cold plates 264 may be used to cool the same type of hardware as cooled by cold plate groups 240.

In the illustrated example, each independent cold plate 264 is arranged in contact with, directly or through a thermally conductive medium, a respective and like numbered one of first central processing unit ("CPU") 260a and second CPU 260b, which may be referred to collectively as CPUs 260. As noted above with regard to DIMMs, CPUs are presented herein by way of example only, so any interaction described between the systems of the present disclosure and CPUs may be equally accurate for components other than CPUs. CPUs 260 are frequently installed near DIMMs 255, but CPUs 260 have differing form-factors and cooling needs than DIMMs 255, making the illustrated implementation of system 200 to cool DIMMs 255 and CPUs 260 an example of where system's 200 combination of cold plate groups 240 and independent cold plates 264 can provide an efficient cooling solution. The above described interaction of valves 216, 226 with the flow path among cold plate groups 240 and independent cold plates 264 also enables system 200 to be dynamically adaptable to the wide range of heat load combinations that DIMMs 255 and CPUs 260 together may present.

Figure 4:
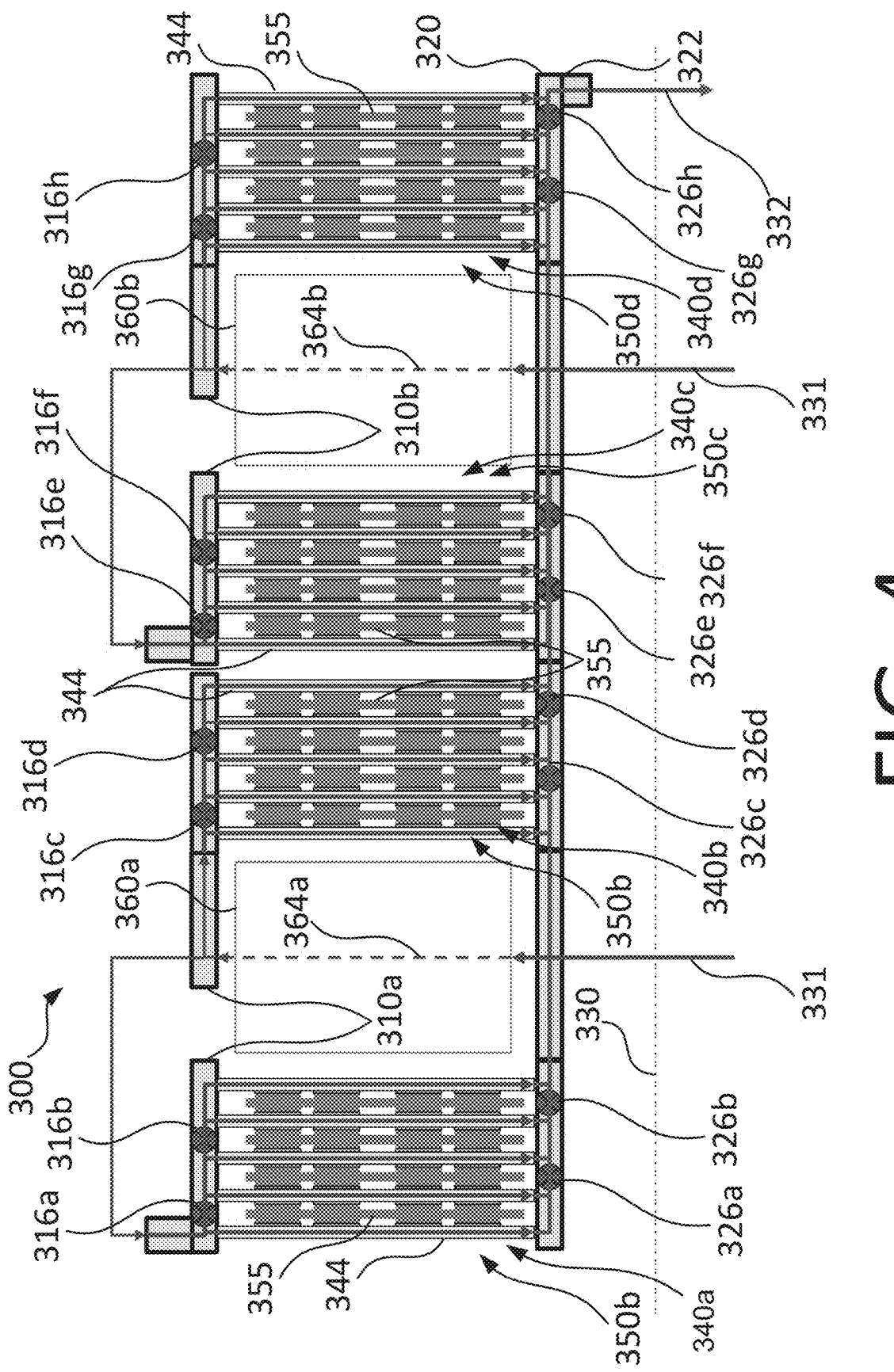
FIG. 4 is a schematic illustration of a computer hardware cooling system in a double inlet manifold arrangement.

FIG. 4 shows a system 300 wherein multiple inlet manifolds 310 are connected to a single outlet manifold 320, and independent conduits 364 act as inlet openings. In FIG. 4 and system 300, elements, such as outlet manifold 320, cold plate groups 340 etc., are generally alike to like numbered elements of system 100, such as outlet manifold 120, cold plate group 140, etc., and of system 200, such as outlet manifold 220, cold plate groups 240, etc. except for specifically stated or illustrated differences. As such, certain numerals may be shown in the figures without specific mention herein.

System 300 includes a first inlet manifold 310a and a second inlet manifold 310b. First independent cold plate 364a carries supply fluid 331 from fluid source 330 into first inlet manifold 310a, and second independent cold plate 364*b* carries supply fluid 331 into second inlet manifold 310*b*. First independent cold plate 364*a* therefore acts as an inlet opening for first inlet manifold 310*a* and second independent cold plate 364*b* therefore acts as an inlet opening for second inlet manifold 310*b*.

First inlet manifold 310*a* is fluidly connected to outlet manifold 320 by first cold plate group 340*a* and second cold plate group 340*b*, and second inlet manifold 310*b* is fluidly connected to second outlet manifold 310 by third cold plate group 340*c* and fourth cold plate group 340*d*.

First inlet manifold 310*a* includes two distinct portions, and second inlet manifold 310*b* includes two distinct portions. First cold plate group 340*a* and second cold plate group 340*b* connect to different portions of first inlet manifold 310*a* on opposite sides of first independent cold plate 364*a*. First cold plate group 340*a* and second cold plate group 340*b* will therefore always receive some fluid directly from first independent cold plate 364*a* in parallel with one another regardless of whether either cold plate group 340*a*, 340*b* is in a series state or a parallel state. Likewise, third cold plate group 340*c* and fourth cold plate group 340*d* are connected to different portions of second inlet manifold 310*b* on opposite sides of second independent cold plate 364*b*, so third cold plate group 340*c* and fourth cold plate group 340*d* will always receive some fluid directly from second independent cold plate 364*b* in parallel with one another regardless of whether either cold plate group 340*c*, 340*d* is in a series state or in a parallel state.

First cold plate group 340*a*, second cold plate group 340*b*, third cold plate group 340*c*, and fourth cold plate group 340*d* all connected to outlet manifold 320 on a common side of outlet opening 322 and are numbered according to increasing proximity to outlet opening 322. As such, any cold plate group 340 in the series state, other than first cold plate group 340*a*, will receive cooling fluid that has already passed through any lower numbered cold plate groups 340 into outlet manifold 320 in addition to cooling fluid from the corresponding inlet manifold 310. However, independent cold plates 364 will always receive only supply fluid 331. System 300 therefore tends to be suitable for applications wherein cooling of CPUs 360 needs to be prioritized over cooling of DIMMs 355.

Figure 5:
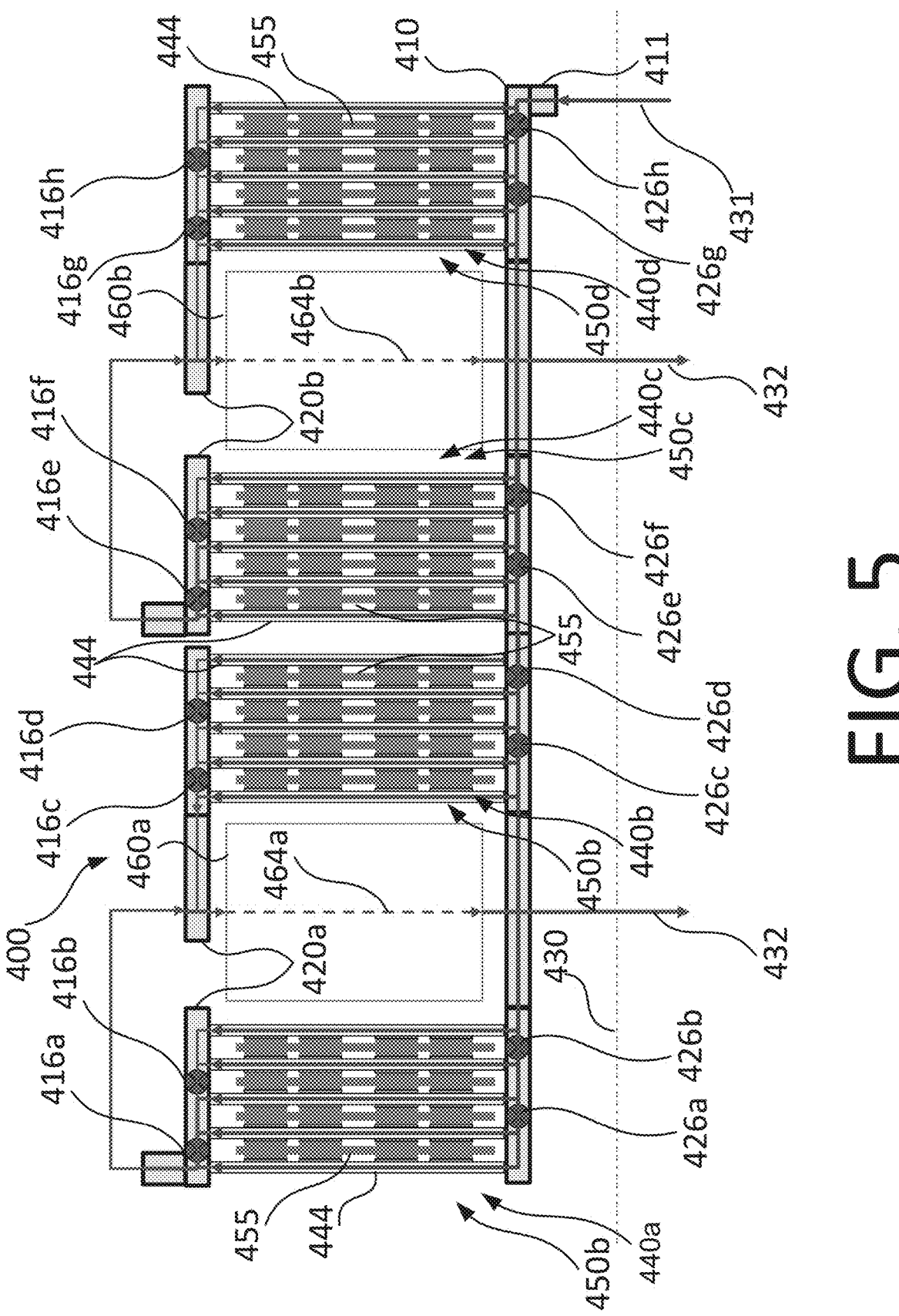
FIG. 5 is a schematic illustration of a computer hardware cooling system in a double outlet manifold arrangement.

FIG. 5 shows a system 400 wherein one inlet manifold 410 connects to multiple outlet manifold 420 and independent cold plates 464 act as outlet openings. In FIG. 5 and system 400, elements are generally alike to like numbered elements of any of the above described systems 100, 200, 300. For example, inlet manifold 410 is generally alike to inlet manifolds 110, 210, 310, and cold plate groups 440 are generally alike to cold plate groups 140, 240, 340, etc., except for specifically stated or illustrated differences. As such, certain numerals may be shown in the figures without specific mention herein.

System 400 includes a first outlet manifold 420*a* and a second outlet manifold 420*b*. Inlet manifold 410 is connected to first outlet manifold 420*a* by first cold plate group 440*a* and second cold plate group 440*b* and inlet manifold 410 is connected to second outlet manifold 420*b* by third cold plate group 440*c* and fourth cold plate group 440*d*. Inlet manifold 410 receives supply fluid 431 through inlet opening 411. First independent cold plate 464*a* carries return fluid 432 out of first outlet manifold 410*a* and thereby acts as an outlet opening for first outlet manifold 410*a*. Similarly, second independent cold plate 464*b* carries return fluid 432 out of second outlet manifold and thereby acts as an outlet opening for second outlet manifold 410*b*.

First outlet manifold 420*a* includes two distinct portions, and second outlet manifold 420*b* includes two distinct portions. First cold plate group 440*a* and second cold plate group 440*b* connect to different portions of first outlet manifold 410*a* on opposite sides of first independent cold plate 464*a*. First cold plate group 440*a* and second cold plate group 440*b* will therefore always deliver some fluid to first independent cold plate 464*a* in parallel with one another regardless of whether either cold plate group 440*a*, 440*b* is in a series state or a parallel state. Likewise, third cold plate group 440*c* and fourth cold plate group 440*d* are connected to different portions of second outlet manifold 410*b* on opposite sides of second independent cold plate 464*b*, so third cold plate group 440*c* and fourth cold plate group 440*d* will always deliver some fluid to second independent cold plate 464*b* in parallel with one another regardless of whether either cold plate group 340*c*, 340*d* is in a series state or in a parallel state.

First cold plate group 440*a*, second cold plate group 440*b*, third cold plate group 440*c*, and fourth cold plate group 440*d* are all connected to inlet manifold 410 on a common side of inlet opening 411 and are numbered according to increasing proximity to inlet opening 411. As such, placing any cold plate group 440 into a series flow state will cause cooling fluid to flow through that cold plate group 440 before reaching any lower numbered cold plate groups 440. System 400 therefore tends to be suitable for applications wherein cooling of DIMMs 455 needs to be prioritized over cooling of CPUs 460.

Figure 6:
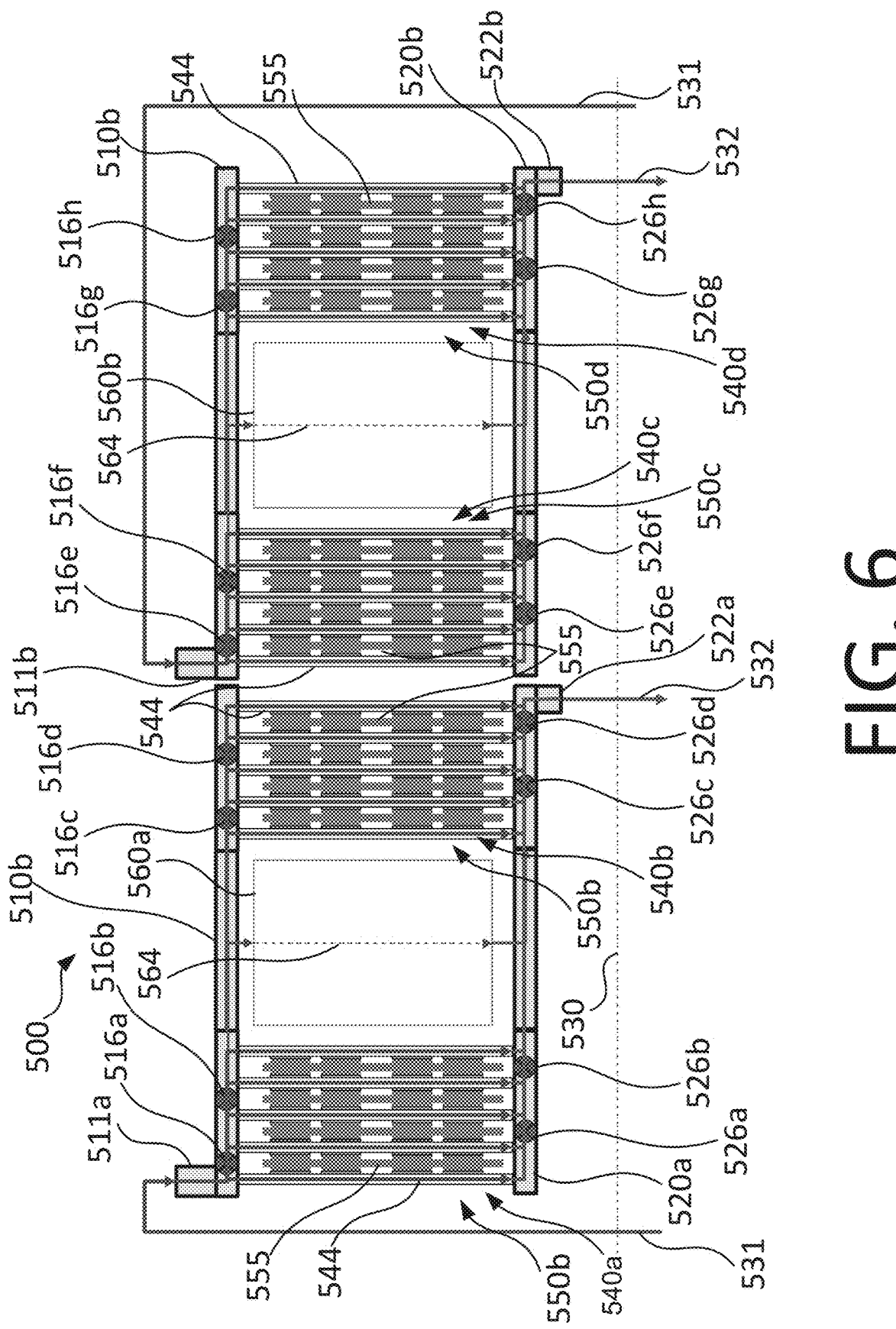
FIG. 6 is a schematic illustration of a computer hardware cooling system in a multi-inlet manifold and multi-outlet manifold arrangement.

FIG. 6 shows a system 500 including multiple subsystems that each include a respective inlet manifold 510 and outlet manifold 520. In FIG. 6 and system 500, elements are generally alike to like numbered elements of any of the above described systems 100, 200, 300, 400. For example, inlet manifolds 510*a*, 510*b* are generally alike to inlet manifolds 110, 210, 310, 410, and cold plate groups 540 are generally alike to cold plate groups 140, 240, 340, 440, etc., except for specifically stated or illustrated differences. As such, certain numerals may be shown in the figures without specific mention herein.

System 500 includes two subsystems, with one subsystem being provided by first inlet manifold 510*a*, second outlet manifold 520*b*, first cold plate group 540*a*, second cold plate group 540*b*, and first independent cold plate 564, and the other subsystem being provided by second inlet manifold 510*b*, second outlet manifold 520*b*, third cold plate group 640*c*, fourth cold plate group 540*d*, and second independent cold plate 564*b*. First inlet manifold 510*a* is not fluidly connected to second inlet manifold 510*b* and first outlet manifold 520*a* is not fluidly connected to second outlet manifold 520*b*. A first flow path extending from first inlet opening 511*a* to first outlet opening 522*a* through first and second cold plate groups 540*a*, 540*b* and first independent cold plate 564*a* therefore does not cross a second flow path extending from second inlet opening 511*b* to second outlet opening 522*b* through third and fourth cold plate groups 540*c*, 540*d* and second independent cold plate 564*b*. System 500 therefore tends to be suitable for applications wherein cooling of certain hardware should remain entirely unaffected by changes to cooling of other hardware.

Systems 200, 300, 400, 500 all present variations of the concept shown in system 100. The variations within each system 100, 200, 300, 400, 500 may all be combined or interchanged in any manner. For example, system 200 may be modified by adapting either or both of inlet opening 211 or outlet opening 222 into an independent cold plate. System 200 may also or alternatively by modified by including cold plate groups 240 connected to inlet manifold 210 on opposite sides of inlet opening 211 or connected to outlet manifold 220 on opposite sides of outlet opening 222. Generally, any system 100, 200, 300, 400, 500 may be modified to have any number of cold plate groups and independent cold plates connecting to inlet manifolds on either side of an inlet opening connecting to outlet manifolds on either side of an outlet opening. Further, any system or subsystem within systems 100, 200, 300, 400, 500 may include any number of inlet manifolds feeding into any number of outlet manifolds. For example, an inlet may feed into multiple outlet manifolds that, in turn, receive fluid from other inlet manifolds. Moreover, the foregoing examples and variations are equally applicable in conductive heating arrangements, wherein supply fluid enters an inlet manifold at a temperature above the target temperature for objects to be heated by the system and return fluid exits an outlet manifold at a lower temperature.

Although the concept herein has been described with reference to particular examples, it is to be understood that these examples are merely illustrative of the principles and applications of the present concept. It is therefore to be understood that numerous modifications may be made to the illustrative examples and that other arrangements may be devised without departing from the spirit and scope of the present concept as defined by the appended claims.

The invention claimed is:

1. A liquid cooling system for a computer hardware arrangement, the system comprising:
a first manifold having an inlet opening;
a second manifold having an outlet opening;
a group of cold plates extending between the first and second manifolds, each of the cold plates within the group of cold plates having a conduit extending therethrough and fluidly connecting the first manifold to the second manifold to define a first portion of a flow path between the inlet and outlet openings, and the system being convertible between a first state wherein the conduits in the cold plates are fluidly connected in parallel and a second state wherein the conduits in the cold plates are fluidly connected in series, wherein each of the cold plates within the group of cold plates is fluidly connected in series with an adjacent one of the group of cold plates; and
a plurality of valves in the first manifold and the second manifold, wherein the plurality of valves is operable to change the first portion of the flow path between the first state and the second state.

2. The system of claim 1, wherein the cold plates within the group of cold plates are evenly spaced from one another.

3. The system of claim 1, wherein the group of cold plates is a first group of cold plates and comprising a second group of cold plates, wherein the cold plates within the second group of cold plates are evenly spaced from one another, each of the cold plates within the second group of cold plates has a conduit extending therethrough and fluidly connecting the first manifold to the second manifold to define a second portion of the flow path, and the system is convertible between a third state wherein the conduits in the second group of cold plates are fluidly connected in parallel and a fourth state wherein the conduits in the second group of cold plates are fluidly connected in series, each of the first state and the second state being independent from and capable of coexisting with both the third state and the fourth state.

4. The system of claim 3, comprising an independent cold plate having a conduit extending therethrough and fluidly connecting the first manifold and the second manifold to define a portion of the flow path, the independent cold plate being spaced from the first group and the second group by a distance greater than a distance between adjacent cold plates in the first group and a distance between adjacent cold plates in the second group.

5. The system of claim 1, comprising either or both of an independent cold plate fluidly connected upstream of the inlet opening relative to the flow path and an independent cold plate fluidly connected downstream of the outlet opening relative to the flow path.

6. The system of claim 3, further comprising
wherein the plurality of valves is operable to change the first portion of the flow path between the first state and the second state, and
wherein the plurality of valves is operable to change the second portion of the flow path between the third state and the fourth state.

7. The system of claim 6, wherein:
the first portion and second portion are in parallel with one another when the first portion is in the first state; and
the second portion follows the first portion in series when the first portion is in the second state.

* * * * *